(No Model.)
C. A. HANSSON.
PROCESS OF PRODUCING PURE CULTIVATED PRESSED YEAST.
No. 491,939. Patented Feb. 14, 1893.
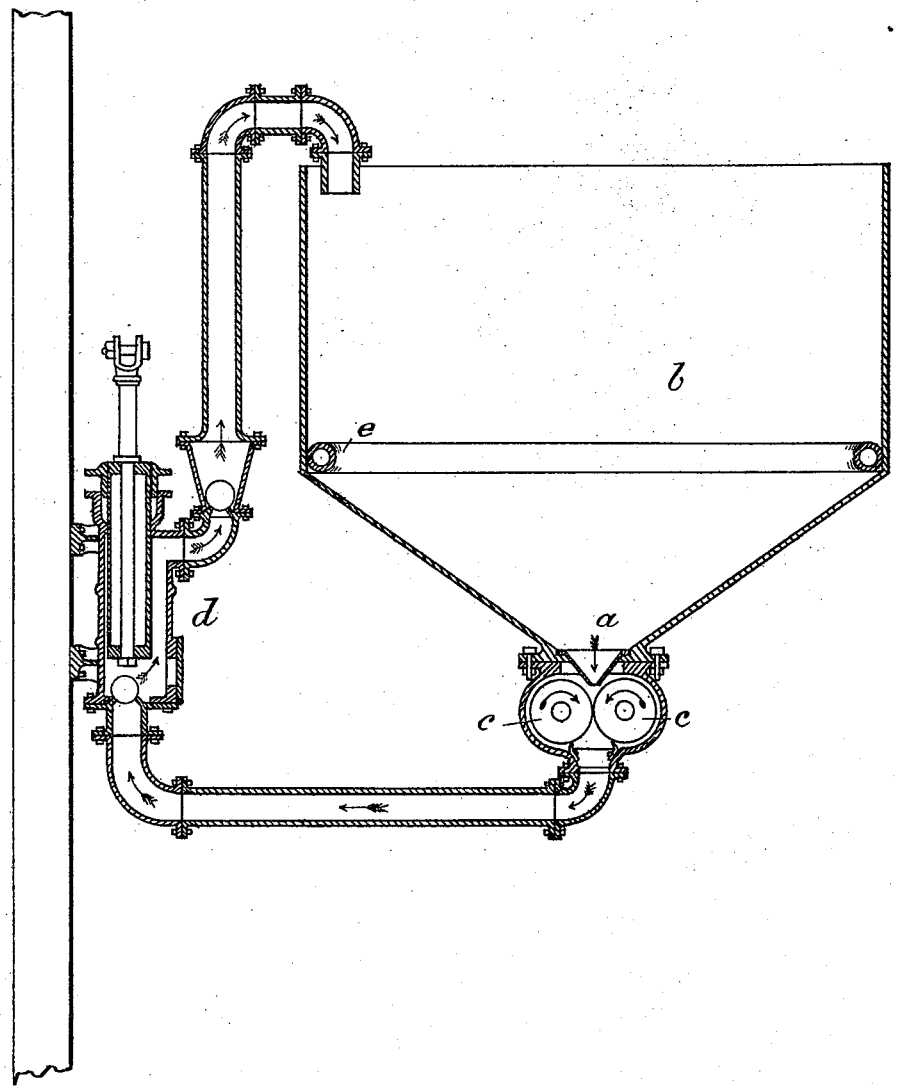
WITNESSES: INVENTOR:

UNITED STATES PATENT OFFICE.

CHARLES A. HANSSON, OF BROOKLYN, NEW YORK.

PROCESS OF PRODUCING PURE CULTIVATED PRESSED YEAST.

SPECIFICATION forming part of Letters Patent No. 491,939, dated February 14, 1893.

Application filed February 12, 1892. Serial No. 421,296. (No specimens.)

*To all whom it may concern:*

Be it known that I, CHARLES A. HANSSON, a subject of the King of Sweden and Norway, and a resident of Brooklyn, in the county of Kings and State of New York, have invented certain new and useful Improvements in Processes of Producing Pure Cultivated Pressed Yeast, of which the following is a specification.

For the production of a pure cultivated pressed yeast it is necessary to have the fluid out of which the yeast is to receive its nourishment free as far as possible from foreign ferments and bacteria, that is sterilized.

According to methods heretofore used in the manufacture of yeast the sterilizing of this fluid could not have been effected to any advantage because, as the theories now existing indicate, the pepsin and not the lactic acid (the latter serving merely as a mediator) acts as a converter of the albumin into peptones, and as the pepsin contained in the grain is insufficient to transform all albuminoids in the mash into peptones, a comparatively small part of it was so transformed, and the greater part would, consequently, during the process of sterilizing, coagulate and thus be rendered insoluble, that is useless as nourishment for the yeast plant. To overcome this difficulty I make use of an additional increment of pepsin, by adding to the mash, a reinforcing quantity of pepsin and by leaving the mash under the influence thereof, together with some inorganic acid, (when necessary) and at a temperature most favorable for the pepsin, whereby much more of the albumin contained in the raw material is transformed into peptones, and I acquire a fluid which may be submitted to heating sufficiently for sterilizing with but little or no detrimental coagulation of albumin. Through the heating process I am enabled to procure a fluid sufficiently sterilized and thereby practically prepared for a pure cultivated yeast.

Having the fermenting tub covered and introducing into the fluid by mechanical means, sterilized air favorable for the development of the yeast, I avoid its infection which would take place should the fermentation be carried out in the usual way.

The procedure is as follows;—referring to the accompanying drawing which represents a sectional elevation of some of the apparatus used. The raw material consists of legumes, as peas, lupines and vetches; root fruits, as potatoes; cereals, as corn, rye, barley and buckwheat, and malt germs and malt. Those parts of the raw material requiring it, as for instance, potatoes &c., are first peeled in any approved way. The malt is crushed and mixed together with the malt germs in water. The legumes, root-fruits and cereals which are to be added to the malt are mixed in, and crushed while heated in water, whereby tearing the shells is avoided, and whereby they are left in a condition to serve as a natural filter in the later stage of the process. This operation being effected in any approved way, as by the hot mixture being caused to flow down through the opening $a$, at the bottom of the tub $b$, through the crushing rolls $c$, and thence being pumped back into the tub again with a pump $d$; the contents of the tub may be heated by means of a coil as $e$, or by any other approved means. The mass is now left standing for some time and then mixed with the malt and malt germs, and the whole is heated up to a mashing temperature while constantly stirred. As soon as the starch in the mash has been transformed by the influence of the diastase into maltose the mash is cooled down to a temperature most favorable for the action of the pepsin which then is added in the proportion of about half of one per-cent. of the albumin contained in the raw material, and, when necessary, also some inorganic acid as sulphuric or hydrochloric acid. The pepsin is thoroughly mixed with the mash which is left at the above named temperature, and preferably, with continued stirring under the influence of the pepsin until as much as possible of the albumin in the raw material is transformed into peptones. The nourishing fluid is thereafter separated from the insoluble matter which is washed out with water, the shells before referred to serving as a natural filter, and the solution thus obtained by mixing the filtrate and wash water if not clear, is separated by means of centrifugal force after which it is heated for sterilizing preferably in a covered tub in order to shut out the air. The sterilized fluid acquired in this manner is cooled down to a fermenting temperature and then brought to fermentation during which process sterilized air is forced into it. The yeast thus procured is separated in the usual way by precipitation, filtration and pressing.

By employing the mechanical crushing process for disintegrating the legumes, root fruits and cereals, I avoid the liability common to the digesting process of transforming the albuminous matters or much of them into undesirable combinations, or destroying them, through the effect of the steam under pressure.

I claim:—

1. In the process of producing pure cultivated pressed yeast, producing a mash by heating in water and at the same time and while heated disintegrating the legumes, root fruits and cereals by a mechanical crushing process, and then mixing the same with the crushed malt and malt germs previously mixed, and heating the mash to a mashing temperature substantially as described.

2. In the process of producing pure cultivated pressed yeast, producing a mash by heating in water and at the same time crushing the legumes, root-fruit and cereals, and mixing the same with the crushed malt and malt germs previously mixed, and heating the mash to a mashing temperature, then cooling the mash to a temperature favorable to the action of pepsin and mixing it thoroughly therewith and leaving it under the influence thereof, preferably under stirring and at a like temperature favorable to its action, and continuing such action until the albumin or as much as practicable thereof contained in the raw material is transformed into peptones.

3. In the process of producing pure cultivated pressed yeast, producing a mash by heating in water and at the same time crushing the legumes, root-fruits and cereals and mixing the same with the crushed malt and malt germs previously mixed, and heating the mash to a mashing temperature, then cooling the mash to a temperature favorable to the action of pepsin and mixing it thoroughly therewith and leaving it under the influence thereof, preferably under stirring, and at a like temperature favorable to its action and continuing such action until the albumin or as much as practicable thereof contained in the raw material is transformed into peptones, then separating the soluble matter, that is, the nourishing fluid from the insoluble matter, sterilizing the nourishing fluid and cooling it down to a fermenting temperature, and subsequently fermenting the same, and introducing sterilized air during the process of fermentation, and finally, separating, filtering and pressing the yeast thus procured substantially as described.

Signed at New York, in the county of New York and State of New York, this 10th day of February, A. D. 1892.

CHARLES A. HANSSON.

Witnesses:
W. J. MORGAN,
W. B. EARLL.